United States Patent [19]
Tolkmith et al.

[11] 3,721,677
[45] March 20, 1973

[54] METHOD FOR INVERTING D AND L CONFIGURATIONS OF OPTICALLY ACTIVE ISOMERS OF ASYMMETRICAL ORGANOPHOSPHOROUS COMPOUNDS

[75] Inventors: Henry Tolkmith, Midland, Mich.; James N. Seiber, Davis, Calif.; Paul B. Budde, Midland, Mich.

[73] Assignee: The Dow Chemical Company, Midland, Mich.

[22] Filed: Dec. 14, 1970

[21] Appl. No.: 98,190

Related U.S. Application Data

[60] Division of Ser. No. 868,595, Oct. 22, 1969, Pat. No. 3,621,031, and a continuation-in-part of Ser. No. 604,153, Dec. 23, 1966, abandoned.

[52] U.S. Cl. ............... 260/309, 260/551 P, 260/959, 424/200

[51] Int. Cl. ................ C07f 9/22, C07f 9/44
[58] Field of Search ....................... 260/309

[56] References Cited

UNITED STATES PATENTS

| | | |
|---|---|---|
| 2,493,318 | 1/1950 | Shonle et al. ............ 260/309 |
| 2,493,319 | 1/1950 | Shonle et al. ............ 260/309 |
| 2,891,025 | 6/1959 | Price ...................... 260/309 |
| 3,227,727 | 1/1966 | Greenley et al. ........ 260/309 |
| 3,227,728 | 1/1966 | Parts ...................... 260/309 |
| 3,244,647 | 4/1966 | Greenley et al. ........ 260/309 |
| 3,359,276 | 12/1967 | Nielsen et al. ........... 260/309 |

*Primary Examiner*—Natalie Trousof
*Attorney*—Griswold & Burdick

[57] ABSTRACT

Optically active isomers of asymmetrical diamino phosphine sulfides containing a P-imidazolyl radical are resolved and separated.

1 Claim, No Drawings

METHOD FOR INVERTING D AND L CONFIGURATIONS OF OPTICALLY ACTIVE ISOMERS OF ASYMMETRICAL ORGANOPHOSPHOROUS COMPOUNDS

CROSS REFERENCE TO RELATED APPLICATION

This application is a division of our co-pending application Ser. No. 868,595, filed Oct. 22, 1969 now U.S. Pat. No. 3,621,031, which is in turn a continuation-in-part of our U. S. application Ser. No. 604,153, filed Dec. 23, 1966, now abandoned.

BACKGROUND OF THE INVENTION

Asymmetrical organophosphorus compounds have been the subject of a considerable amount of interest. This interest arises, in a substantial part, from the fact that a great number of organophosphorus compounds exhibit various biological activities, and many such compounds find commercially important application in areas of animal health, crop raising, control of disease-carrying insects, and the like. Representative organophosphorus compounds include, for example, (ethylamino)(4-nitrophenoxy) (amino) phosphine sulfide and (dimethylamino) (4-nitrophenoxy) (methylamino)phosphine sulfide taught as insecticides in U.S. Pat. No. 2,552,577; N,N-diethyl N'-n-butyl phenyl phosphonodiaminothionate, useful as a herbicide. P-imidazol-1-yl-N,N-dimethyl-P-phenyl phosphinothioic amide, (diethylamino)phenyl-(2-methyl-imidazol-1-yl) phosphine sulfide, P-imidazol-1-yl-N-n-butyl-N-methyl-P-phenyl phosphinothioic amide, (diethylamino)phenyl-(imidazol-1-yl)phosphine sulfide, P-imidazol-1-yl-N,N-diethyl-P-phenyl phosphinothioic amide, and other related compounds taught in U.S. Pat. No. 3,323,990 to be useful as fungicides.

More recently, as the field of organophosphorus chemistry has advanced, there has been increased attention to the mechanisms whereby the various organophosphorus compounds effect the biological activity exhibited. It is in this regard that attention is focused on those biologically active organophosphorus compounds in which the phosphorus atom is asymmetric. In particular, it has been questioned whether either of the enantiomers of such a substance might exhibit a pattern of activity different from the activity otherwise associated with the substance as its known and used racemic mixture; especially since such is true with other known racemic mixtures. Determination of this is dependent upon separation of the enantiomers of the racemic mixture and subsequent separate testing. However, resolution of such racemic mixtures has met with considerable difficulty, and only a few reactions have been developed. Such methods are, for example, taught by Aaron et al. J.A.C.S. Vol. 80, pages 107–110 and 456–458 (1958), Vol. 82, pages 596–598 (1960) and Vol. 84, pages 617–621 (1962); Coyne et al. J.A.C.S. Vol. 78, pages 3061–3063 (1956) and Marsi et al. J.A.C.S. Vol. 78, pages 3063–3066 (1956). Generally, these reactions require that the organophosphorus compound contain an acidic or basic group which can be reacted with an appropriate resolving agent. Such a group is not found in many commercially important organophosphorus compounds.

Moreover, even when the requisite acidic or basic group is present, many hitherto available resolving methods have been accompanied by limitations, such as difficult procedures and/or low yields. Hence, new methods for the resolution of organophosphorus compounds are needed. Such methods have now been found.

SUMMARY OF THE INVENTION

The present invention is directed to a method of resolving and synthesizing asymmetrical diamino phosphine sulfide compounds to separate the optically active enantiomer. The method involves reacting an organophosphorus compound corresponding to the formula

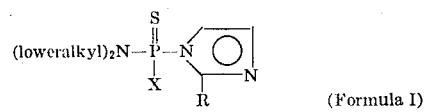
(Formula I)

with a compound of the formula loweralkyl-Y thereby obtaining an intermediate complex corresponding to the formula

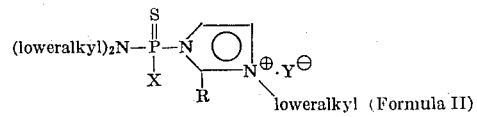
(Formula II)

In these and succeeding formulas, the term "loweralkyl" represents and alkyl radical of 1 to 4 carbon atoms, inclusive; R represents hydrogen or loweralkyl; and X represents a radical of the formula

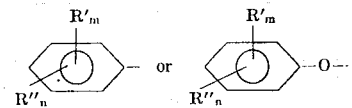

wherein R' represents loweralkyl or cyclohexyl; R'' represents chloro, nitro or methyl mercapto; m represents an integer of from 0 to 2, inclusive; n represents an integer of from 0 to 3, inclusive, and the sum of m+n represents an integer of from 0 to 3, inclusive; and "loweralkyl-Y" represents a loweralkyl ester of an optically active camphorsulfonic acid, i.e. Y is an anion of an optically active camphorsulfonic acid.

The intermediate mixture so obtained is separated into its diastereomeric isomers by conventional fractional crystallization. The so separated diastereoisomers are each separately reacted with an alkali metal iodide to obtain an optically active derivative corresponding to the formula

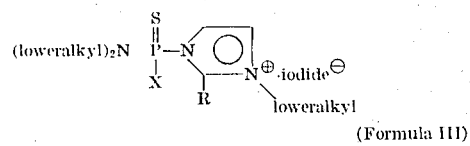
(Formula III)

The so recovered derivatives, i.e. enantiomers, are thereafter each separately reacted with a non-tertiary amino type compound of the formula

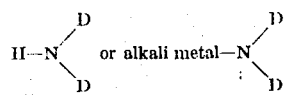

wherein each D independently represents hydrogen, loweralkyl of 1 to 4 carbon atoms, inclusive, or phenyl or both D's taken together with the nitrogen atom represent an imidazolyl radical of the formula

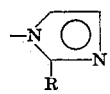

wherein R is as hereinbefore defined; to thereby obtain an enantiomer corresponding to the formula

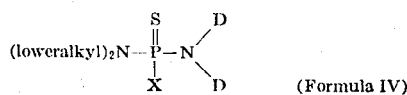

wherein loweralkyl, D and X are as hereinbefore defined.

In the present specification and claims, the term "alkali metal" is employed to refer to sodium, potassium and lithium, only.

A general reaction scheme of the present process is as follows:

with an optically active compound, "loweralkyl-Y" (Step I). In this step, an intermediate mixture corresponding to Formula II is prepared, said intermediate exists as a mixture of a pair of diastereoisomers. The mixture of diastereoisomers is resolved to separate each of the optical isomers (Step II) and thereafter, each of the separated diastereoisomers is separately reacted with an alkali metal iodide to prepare the iodide complex (Step III), which complex exists as the enantiomer. The so prepared complex is reacted with an amino compound as hereinbefore defined to obtain the ultimate optical enantiomeric product (Formula IV). This reaction (Step IV) with the amino compound results in the breaking of the bond of the phosphorus atom to the nitrogen of the imidazolyl ring and the subsequent preparation of the product of Formula IV. This reaction occurs with essentially 100 percent inversion of the enantiomeric form of the asymmetric phosphorus atom. Thus, the ultimate product obtained in such procedures exists in an enantiomeric form which is the inverse of that of the intermediate employed.

In carrying out the present invention, a starting asymmetrical organophosphorus compound of Formula I (as a racemic mixture) is contacted with the loweralkyl-Y reactant. Representative loweralkyl-Y reactants include, for example, the loweralkyl α-d-camphor sulfonates, the loweralkyl 3-α-d-camphor sul-

STEP I

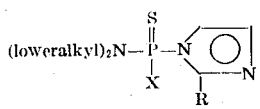 + loweralkyl-Y ⟶ 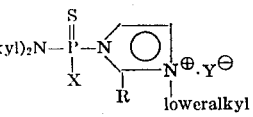

Formula I                                                                Formula II

STEP II diastereoisomeric mixture of Formula II + $\xrightarrow{\text{fractional crystallization}}$ d and l diastereoisomers of Formula II

STEP III

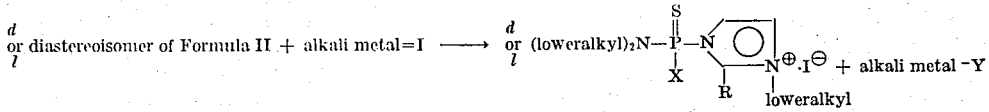

Formula III

STEP IV

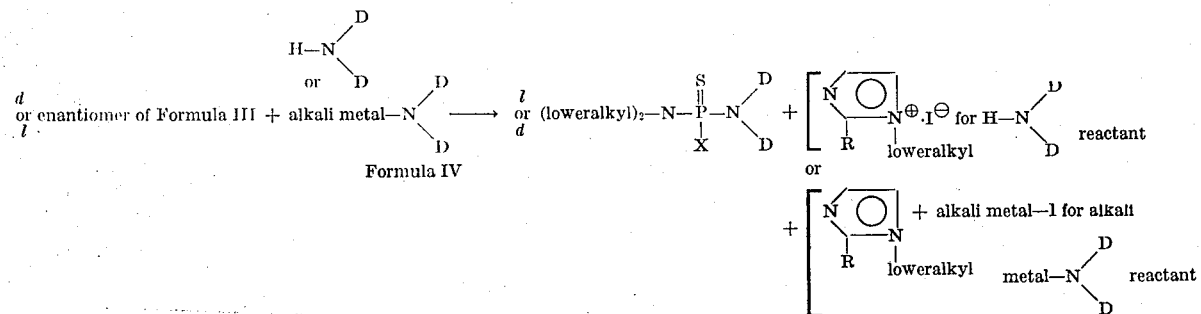

Formula IV

As is evident from a study of the foregoing, the phosphorus atom in the compounds of Formula IV is asymmetric and such compounds have hitherto existed only in a racemic mixture. In accordance with the present invention, however, such compounds can be resolved and synthesized into their enantiomers.

In carrying out this process, the starting compound of Formula I, which is a racemic mixture, is reacted fonate and the loweralkyl α-bromocamphor-π-sulfonates.

After the reactants are contacted together, the reaction goes forwardly readily and gives good yields. The reaction is conveniently carried out in the presence of an inert liquid reaction medium, typically an organic liquid. Suitable such organic liquids include, for example, ether, acetone and secondary alkanols. The reaction consumes the reactants in equimolar amounts, i.e. one molecular proportion of the starting organophosphorus material to one molecular proportion of the loweralkyl-Y reactant, and the employment of the reactants in such amounts, is preferred. The reaction goes forward under temperatures of from 0° to 100° C., but is conveniently carried out at temperatures of from 0° to 50° C.

After the reactants are contacted with one another, the resulting reaction mixture may be held for a period of time following the contacting to insure completion of the reaction. The organophosphorus compound thus produced typically appears in the reaction mixture as a precipitate and is conveniently separated by filtration or decantion. The substance can be used directly in the further practices of the present invention, or can be purified, in conventional procedures, before being so employed.

The intermediate complex mixture of Formula II is separated into its diastereoisomers. The separation is carried out in accordance with conventional procedures, typically, by fractional recrystallization from a suitable solvent such as, for example, benzene, cyclohexane or hexane. In many instances, it is convenient to separate only one diastereoisomer. This feature is not necessarily a disadvantage. When it is desired to obtain the other diastereoisomer, it can be obtained by the further practices of the present invention to be hereinafter defined.

After separation, each of the separated diastereoisomers is reacted with an alkali metal iodide which transforms the complex into an enantiomeric iodide complex. Representative alkali metal iodides include, sodium iodide, potassium iodide and lithium iodide. The so-produced enantiomer remains in its respective dextrorotatory or levorotatory form. The reaction conditions for carrying out this step are the same as hereinbefore set forth for preparing the initial complex.

The enantiomeric products of this step are separately reacted with a non-tertiary amino type compound as hereinbefore set forth. Representative amino type compounds include, for example, ammonia, methylamine, dimethylamine, ethylamine, diethylamine, n-propylamine, isopropylamine, aniline, 2-ethylbutylamine, isobutylamine, or N-heterocyclics and their loweralkyl substituted compounds including, imidazole, 2-methylimidazole and the N-alkali metal salts of the above compounds.

The following examples illustrate the present invention and will enable those skilled in the art to practice the same.

Preparation of Complexes of Formula II

EXAMPLE 1 dl-(Diethylamino)phenyl(2-methylimidazol-1-yl)phosphine sulfide (103 grams; 0.35 mole) is mixed with 1 liter of anhydrous ether and the resulting mixture filtered to remove a small amount of insoluble impurities. Thereupon, 93 grams of methyl α-d-camphorsulfonate (0.40 mole) are added to the filtrate. The addition is carried out at room temperature; after completion of the addition, the resulting reaction mixture is heated to reflux temperature, with stirring, and the mixture refluxed for 30 hours with continued stirring. The mixture is cooled to 0° C., and held at that temperature for 2 hours, and filtered to separate the desired dl-(diethyl-amino)phenyl(2-methylimidazol-1-yl)phosphine sulfide 3-methyl α-d-camphorsulfonate product. The product is washed with anhydrous ether (at 0° C.) and dried; the product thus obtained melts at 130°–132.5° C. and represents an 85 percent yield. The specific rotation of this product is found to be $[\alpha]_D^{25} +41.2°$ (at a concentration of 1.786 grams per 100 milliliters of chloroform). The product is analyzed by nuclear magnetic resonance and the results confirm the identity of the product obtained.

EXAMPLE 2 dl-(Diethylamino)2,4-dichlorophenoxy(2-methylimidazol-1-yl)phosphine sulfide (15.0 grams, 0.04 mole) and diethyl ether (150 milliliters) is stirred in a 1.0 liter-three-necked flask at reflux temperature for 4.0 hours. Methyl 3-α-d-camphorsulfonate (10.0 grams, 0.04 mole) in diethyl ether (150 milliliters) is added. With stirring the resulting mixture is heated for 18.0 hours at reflux temperature. The diethyl ether is evaporated off under vacuum. Diethyl ether (100 milliliters) is added to the flask and the contents stirred and heated at reflux for another 18.0 hrs. The solvent is evaporated off and 600 milliliters of diethyl ether is added and the mixture vigorously stirred for 1.0 hr. at room temperature. The insoluble dl-(diethylamino)2,4-dichlorophenoxy(2-methylimidazol-1-yl)phosphine sulfide 3-methyl-α-d-camphor-sulfonate is filtered and dried. It melts at 107°–108° C. and the yield is 62.0 percent. The specific rotation of this product is found to be $[\alpha]^{25}_D + 29.50°$ (at a concen-tration of 0.99 grams per 100 milliliters methanol). The product is analyzed by nuclear magnetic resonance, infrared and elemental analyses to confirm the identity of the product obtained.

A similar preparation in ethyl acetate instead of diethyl ether gives a 76.2 percent yield of product.

EXAMPLE 3 dl-(Diethylamino)2-chloro-4-t-butylphenoxy(2-methylimidazol-1-yl)phosphine sulfide 3-methyl-camphorsulfonate is obtained in a 92.2 percent yield from equivalent molar amounts of dl-(diethylamino)-2-chloro-4-t-butylphenoxy(2-methylimidazol-1-yl)phosphine sulfide and methyl 3-α-d-camphorsulfonate. Preparation is similar to the method described in Example 2. dl-(Diethylamino)-2-chloro-4-t-butylphenoxy(2-methylimidazol-1-yl)phosphine sulfide 3-methyl-camphorsulfonate has a specific rotation of $[\alpha]_D^{25} + 28.10°$ (at a concentration of 1.104 grams per 100 milliliters methanol). Structure of the product is verified by nuclear magnetic resonance, infrared and elemental analyses.

Resolution (Step II)

EXAMPLE 4

The dl-(diethylamino)phenyl(2-methylimidazol-1-yl)phosphine sulfide 3-methyl α-d-camphorsulfonate product as obtained in Example 1 is resolved to separate the less soluble diastereoisomer. More particularly, the compound is dissolved in 2 liters of benzene at a temperature of 50° C., with rapid stirring of the resulting solution. Thereafter, the solution is cooled to room temperature and crystallization induced by rubbing the side of the reaction vessel with a glass rod. The mixture is further cooled to 10° C. and held at that temperature for 10 hours, at which time the reaction mixture is filtered. The solid thus obtained is washed with 50 milliliters of benzene (at 10° C.) and thereafter dried to obtain a crystalline solid melting at 127°–130° C. The specific rotation of the substance is determined to be $[\alpha]^{25}_D + 0.65°$ (at a concentration of 1.854 grams per 100 milliliters of chloroform). The nuclear magnetic resonance spectrum is essentially identical with that obtained on the diastereoisomer mixture as prepared in Example 1. The solid is recrystallized from 1.8 milliliters of benzene, resulting in 17.1 grams of purified 1-(diethylamino)phenyl(2-methylimidazol-1-yl)phosphine sulfide 3-methyl α-d-camphor-sulfonate, melting at 132°–133° C. The specific rotation of this product is determined to be $[\alpha]^{25}_D - 3.14°$ (at a concentration of 1.752 grams per 100 milliliters of chloroform).

Preparation of Complex of Formula III

EXAMPLE 5

A portion of the 1-(diethylamino)phenyl(2-methylimidazol-1-yl)phosphine sulfide 3-methyl α-d-camphorsulfonate (7.01 grams; 0.013 mole), as prepared in Example 1 (separated in Example 4), is added to a solution of 1.947 grams of sodium iodide (0.013 mole) in 85 milliliters of redistilled acetone. The resulting reaction mixture is swirled until precipitation appeared complete, about 5 minutes, and heated to a temperature of 50° C. and maintained thereat for 30 minutes. The reaction mixture is filtered to remove impure sodium α-d-camphorsulfonate and acetone is removed from the filtrate by evaporation under subatmospheric pressure to obtain the desired 1-(diethylamino)phenyl(2-methylimidazol-1-yl)phosphine sulfide 3-methyl iodide product. The product is mixed with 25 milliliters of chloroform and the resulting mixture filtered to separate a small amount of additional sodium α-d-camphorsulfonate. The chloroform is removed by evaporation under subatmospheric pressure and the resulting product residue, a glass, is dissolved in 15 milliliters of methanol at room temperature. Ether is added to the solution to saturation (75 milliliters). The solution is cooled to 10° C. and crystallization induced by rubbing the sides of the reaction vessel with a glass rod. The product precipitates, the desired 1-(diethylamino)phenyl(2-methylimidazol-1-yl)phosphine sulfide 3-methyl iodide, is separated by filtration and thereafter dried. It is recrystallized twice, in the same manner, from a 1:4 methanol-ether solution; the product thus obtained melts at 194°–195° C. It has a specific rotation of $[\alpha]^{25}_D - 70.3°$ (at a concentration of 1.440 grams per 100 milliliters of chloroform). A nuclear magnetic resonance spectrum of the compound is identical with a nuclear magnetic resonance spectrum obtained on an authentic sample of dl-(diethylamino)phenyl(2-methyl-imidazol-1-yl)phosphine sulfide 3-methyl iodide which is prepared by reacting methyl iodide with dl-(diethylaminio)-phenyl(2-methylimidazol-1-yl)phosphine sulfide and found to possess the following structure.

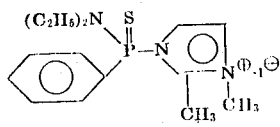

EXAMPLE 6

In analogy to the reaction described by this example other compounds of Formula III are prepared by reacting acetone-soluble alkali metal iodides with appropriate complexes of Formula II to give, for example, (diethylamino)2,4-dichlorophenoxy(2-methylimidazol-1-yl)-phosphine sulfide 3-methyl iodide; melting at 155°–156° C.

Preparation of Compounds of Formula IV

EXAMPLE 7

1-(Diethylamino)phenyl(2-methylimidazol-1-yl)phosphine sulfide 3-methyl iodide (2.0 grams; 0.00461 mole), a portion of the product as prepared in Example 5 is mixed with 75 milliliters of 1,2-dimethoxyethane. The mixture is cooled to a temperature of 0° C. and maintained under nitrogen. Thereafter, 0.48 gram of 1-sodio-2-methylimidazol (0.00461 mole) is added portionwise to the mixture over a period of 40 minutes. The resulting reaction mixture is maintained at 0° C. for an additional 2 hours, at which time the solvent is removed by evaporation under subatmospheric pressure. The residue is mixed with 80 milliliters of benzene and cooled to 10° C. and maintained thereat for a period of 1 hour. Thereafter, the mixture is filtered to remove sodium iodide and and the filtrate extracted with five successive 50-milliliter portions of ice water to remove 1,2-dimethylimidazole. Benzene. Benzene is thereafter removed by evaporation under subatmospheric pressure to obtain the desired d-(diethylamino)phenyl-(2-methylimidazol-1-yl)phosphine sulfide product as a residue. This product residue is a thick syrup which partially solidified upon standing. Its specific rotation is $[\alpha]^{25}_D + 7.4°$ (at a concentration of 1.622 grams per 100 milliliters of chloroform). On standing in contact with 10 milliliters of cyclohexane at a temperature of 10° C. for several hours, the product solidifies completely and is separated by filtration and thereafter dried. The product thus obtained is found to exist as a colorless crystalline solid melting at 82°–83 C. and having a specific rotation of $[\alpha]^{25}_D + 8.2°$ (at a concentration of 1.404 grams per 100 milliliters of chloroform), and of +5.6° (at a concentration of 1.376 grams per 100 milliliters of benzene). This optical isomer possesses the same degree of useful fungitoxicity as the racemic compound (SCIENCE 158, 1462) but is less than half as toxic to mammals than is the racemate, and, therefore, a practically more valuable plant fungicide.

EXAMPLE 8

Exactly as described in the preceding example, l-(deithylamino)phenyl (2-methylimidazol-1-yl)phosphine sulfide 3-methyl iodide is allowed to react with imidazol--1-yl sodium. The resulting reaction mixture is worked up as outlined in the foregoing example and affords the desired compound as a colorless oil, having a specific rotation of $[\alpha]^{25}_D + 15.0°$ (at a concentration of 1.2 grams per 100 milliliters of chloroform). This optically active compound is of low mammalian toxicity and of powerful activity as against *Erysiphe cichoracearum* and *Phytophthora infestans*, and other important plant fungi (SCIENCE 158, 1462).

EXAMPLE 9

A partial solution of 1.00 grams of l-(diethylamino)phenyl (2-methylimidazol-1-yl)phosphine sulfide 3-methyl iodide (0.0023 mole) in 25 milliliters of 1,2-dimethoxyethane containing 0.168 gram of n-butylamine (0.0023 mole) is refluxed for 20 hours. The resulting mixture is evaporated to dryness under subatmospheric pressure and the remaining residue mixed with 50 milliliters of benzene and filtered to remove 2,3-dimethylimidazole hydriodide byproduct. The filtrate is extracted with five successive 30-milliliter portions of water, dried, and evaporated under subatmospheric pressure to obtain the desired d-(diethylamino)(n-butylamino)phenyl (n-butylamino)phenyl phosphine sulfide product as a residue. The product thus obtained is a colorless oil having a specific rotation of $[\alpha]^{25}_D + 17.2°$ (at a concentration of 1.1 grams per 100 milliliters of chloroform). The substance is analyzed by nuclear magnetic resonance analysis and the spectrum thereby obtained found to be essentially identical with the nuclear magnetic resonance spectrum obtained on the racemic mixture of the same substance prepared by reacting dl-(diethylamino)phenyl(2-methylimidazol-1-yl)phosphine sulfide 3-methyl iodide with n-butylamine.

In analogy to the reactions described in the preceding example and using the appropriate reactants as disclosed herein, other compounds of Formula IV are synthesized, for example:

(Ethylamino)(4-nitrophenoxy)(amino)phosphine sulfide; having a density of 1.15 at 24° C.

(Dimethylamino)(amino)(2,4,5-trichlorophenoxy)phosphine sulfide; melting at 119°–120°.

(Dimethylamino)(methylamino)(2,6-dicyclohexyl-4-methyl-phenoxy)phosphine sulfide; melting at molecular 174°–176°.

(Dimethylamino)(N-methylanilino)(2-chloro-4-t-butyl-phenoxy)phosphine sulfide; having a molecular weight of 397.

(Dibutylamino)(2-methylthio phenoxy)(amino) phosphine sulfide; having a molecular weight of 346.

Inversion of the Configuration of Enantiomers

The inversion of the configuration of one enantiomer to the other configuration can be readily obtained. The inversion is more easily explained by the following reaction scheme

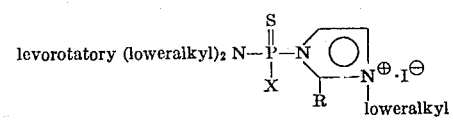

↓

Step IV

↓

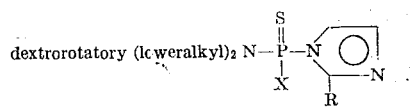

↓ reaction with loweralkyl iodide by contacting the two reactants at ambient temperature for about 5 hours.

↓

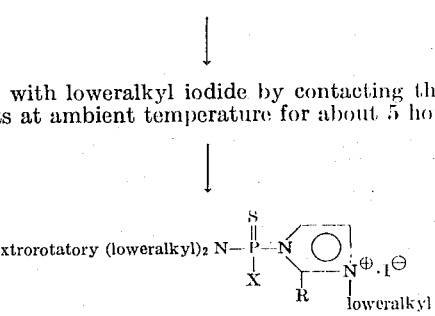

↓

Step IV

↓

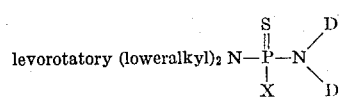

EXAMPLE 10

A solution of 3.00 grams of d-(diethylamino)-phenyl(2-methylimidazol-1-yl)phosphine sulfide (prepared as reported hereinabove: Example 7) in 15 milliliters of methyl iodide is allowed to stand at room temperature for 5 hours; during this period of time, a crystalline precipitate appears in the reaction mixture. The precipitate, the expected d-(diethylamino)phenyl(2-methylimidazol-1-yl)phosphine sulfide 3-methyl iodide, is separated by filtration and thereafter purified by recrystallization from a mixture of methanol and ether at room temperature. The product thus obtained melts at 194.0°–196.5° C. and has a specific rotation of $[\alpha]_D^{25} + 71.5°$ (at a concentration of 1.8 grams per 100 milliliters of chloroform). The nuclear magnetic resonance spectrum of the product is essentially identical with the spectrum of its optical antipode (Example 5).

EXAMPLE 11 d-(Diethylamino)phenyl(2-methylimidazol-1-yl)phosphine sulfide 3-methyl iodide (3.40 grams; 0.00781 mole), (a portion of the substance prepared in the preceding Example) and 1-sodio-2-methylimidazole (0.81 gram; 0.00780 mole) are reacted together as follows. The sodium salt is dispersed in 1,2-dimethoxyethane (100 milliliters). The resulting dispersion is cooled to 0° C. and maintained under a nitrogen atmosphere. The phosphine sulfide methyl iodide is added to the dispersion, portionwise over a period of one hour at a temperature of 0° C. Thereafter, the reaction mixture is permitted to warm to room temperature, at which temperature it is held, with stirring, for an additional three hours, and evaporated to dryness under subatmospheric pressure, thereby obtaining a residue. This residue is mixed with 50 milliliters of benzene and filtered to separate sodium iodide byproduct. The benzene filtrate is extracted with four successive 15-milliliter portions of water, to remove 1,2-dimethylimidazole byproduct, and dried over sodium sulfate and evaporated to dryness under subatmospheric pressure to obtain the desired l-(diethylamino)phenyl(2-methylimidazol-1-yl)phosphine sulfide product as a residue. This product residue, a thick, colorless syrup, crystallized on standing in contact with 20 milliliters of cyclohexane for several hours, at room temperature. The crystallized product melts at 82°–84° C. It is found to exhibit a specific rotation of $[\alpha]^{25}_D - 9.3°$ (at a concentration of 1.2 grams per 100 milliliters of chloroform). The nuclear magnetic resonance spectrum of the product is essentially identical with the spectrum of the d-enantiomer (Example 7).

All of the compounds of the above Examples (1–11) have been found to be effective pesticides.

The compounds to be employed as starting materials in accordance with the present invention:

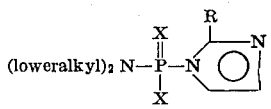

are prepared by reacting an imidazole reactant:

with an appropriate phosphorus compound, which is of the following formula:

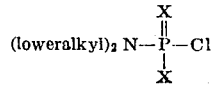

The reaction of imidazole reactant and phosphorus compound is carried out in the presence of a hydrogen chloride acceptor and in the presence of an inert liquid reaction medium. The imidazole reactant can be employed as the hydrogen chloride acceptor. Good results are obtained when operating at temperatures of from 15° to 60° C. and when employing stoichiometric proportions of the reactants and of hydrogen chloride acceptor.

The alkyl camphorsulfonates used as starting materials are all well-known compounds and can be conveniently prepared by the method taught in J. Chem. Soc. 97, pages 223–231 (1910) or J. Indian Chem. Soc. 35, pages 49–52 (1958), whereby equivalent amounts of an alkali metal alkyl oxide is heated with an appropriate camphorsulfonyl halide in the respective alcohol.

What is claimed is:

1. Method of inverting the configuration of a dextrorotatory or levorotatory enantiomer of the formula

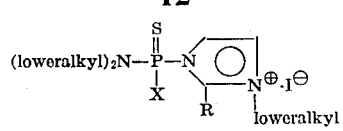

which comprises reacting the said dextrorotatory or levorotatory enantiomer with a compound of the formula

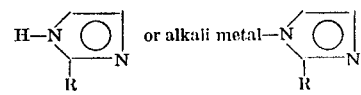

in equimolar proportions at a temperature between 0° and 100°C. in the presence of an inert organic liquid medium to obtain the inverted enantiomer of the formula

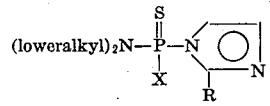

wherein the term "loweralkyl" represents alkyl of 1 to 4 carbon atoms; R represents hydrogen or loweralkyl with the proviso that in each occurance, R is always the same and X represents a radical of the formula

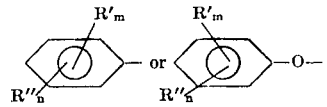

wherein R' represents loweralkyl or cyclohexyl; R'' represents chloro, nitro or methyl mercapto; m represents an integer of from 0 to 2; n represents an integer of from 0 to 3; and the sum of m + n represents an integer of from 0 to 3; reacting the thus obtained inverted enantiomer with a loweralkyl iodide in equimolar proportions at temperatures of from 0° to 100°C. in the presence of an inert organic liquid reaction medium to obtain an enantiomer of the formula

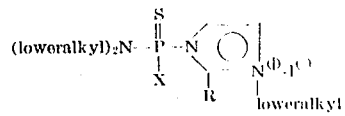

having the configuration inverted to that of the starting enantiomer.

* * * * *